Dec. 1, 1970  L. L. LOW  3,544,152
MOBILE TRAILER WITH ROLL-OUT KITCHEN UNIT
Filed April 3, 1969  3 Sheets-Sheet 1
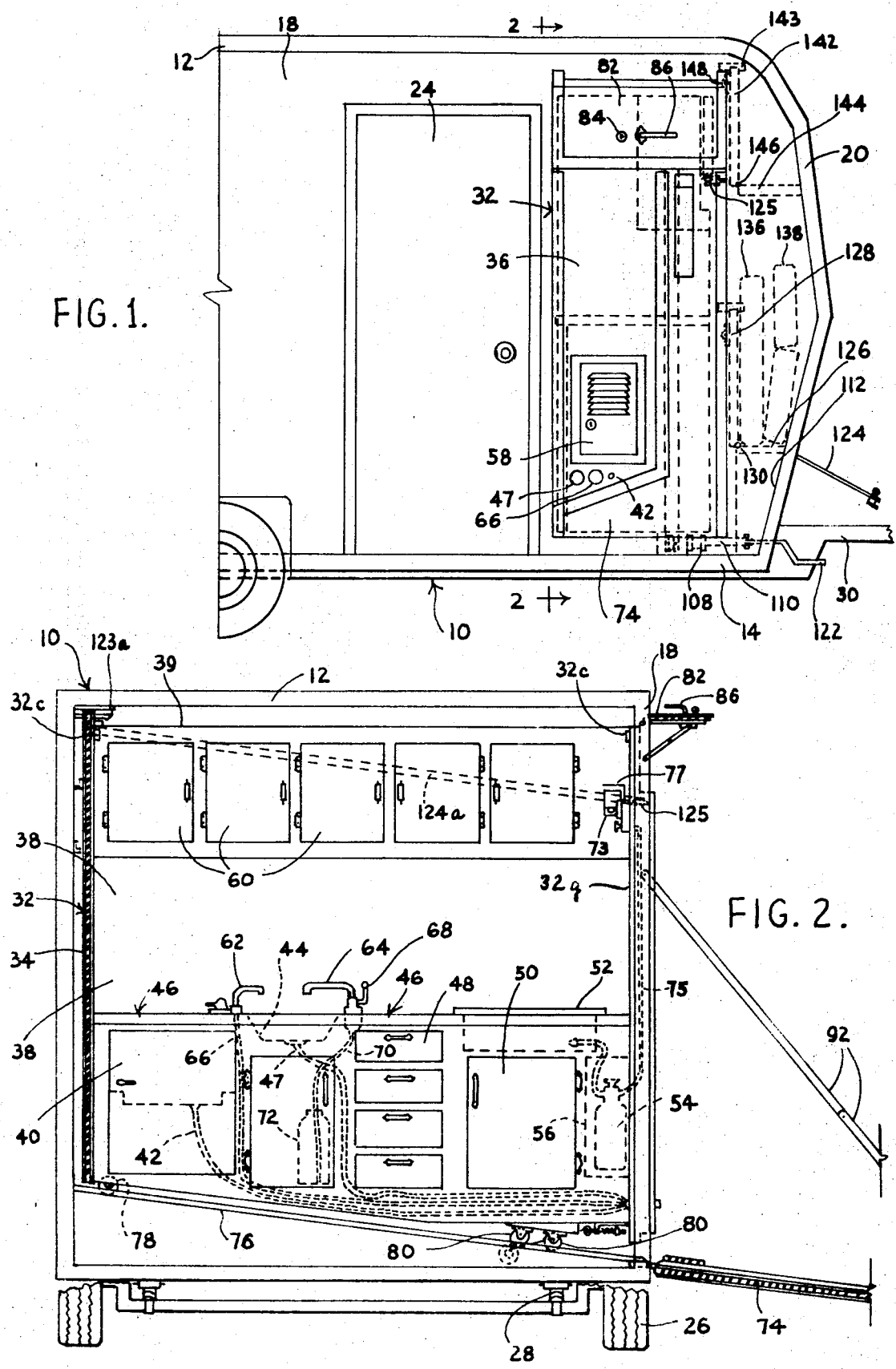

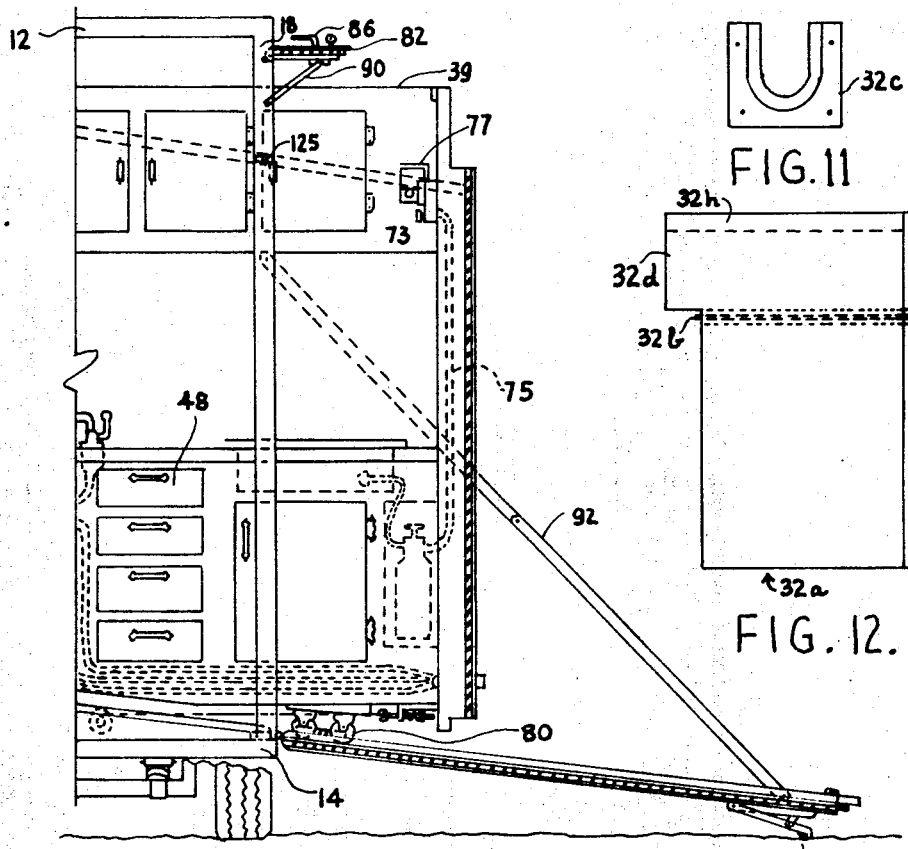
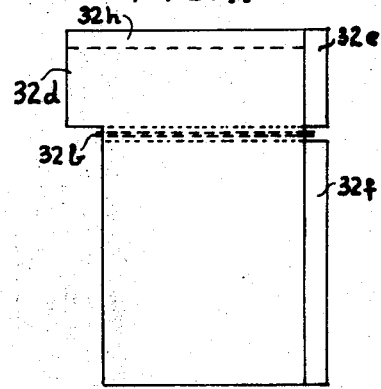
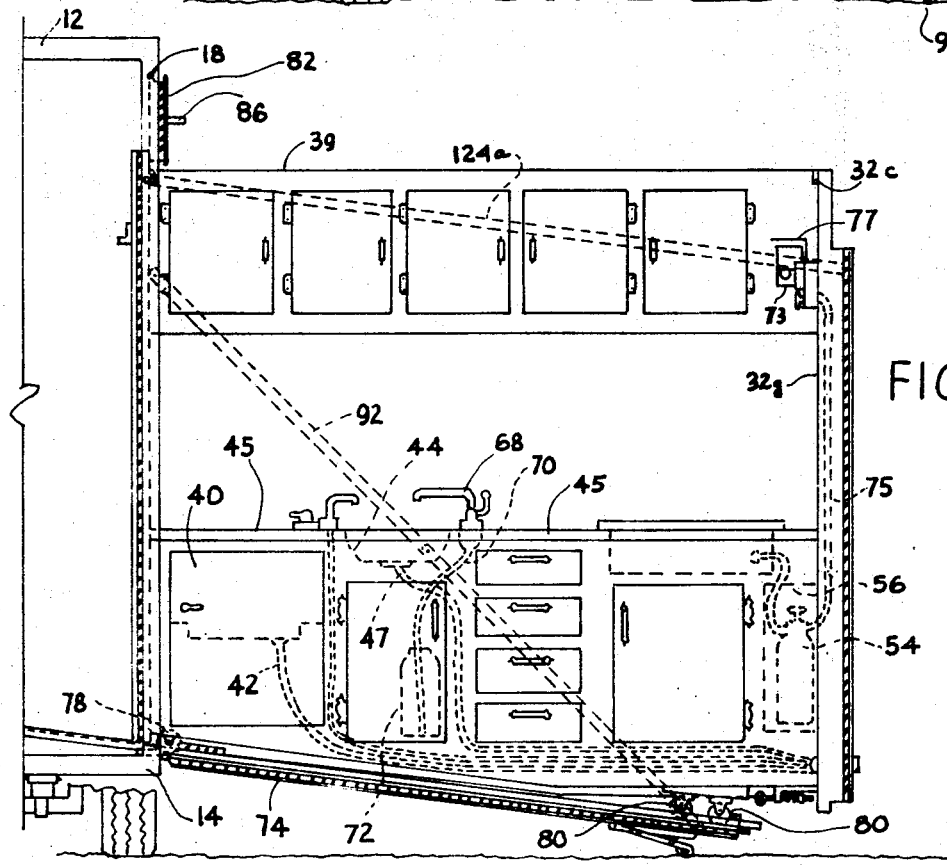

Dec. 1, 1970                L. L. LOW                3,544,152
           MOBILE TRAILER WITH ROLL-OUT KITCHEN UNIT
Filed April 3, 1969                              3 Sheets-Sheet 3

United States Patent Office 3,544,152
Patented Dec. 1, 1970

3,544,152
MOBILE TRAILER WITH ROLL-OUT KITCHEN UNIT
Lester L. Low, 1120 S. Pacific Hwy.,
Talent, Oreg. 97540
Filed Apr. 3, 1969, Ser. No. 813,173
Int. Cl. B60p *3/32*
U.S. Cl. 296—23            11 Claims

ABSTRACT OF THE DISCLOSURE

A mobile trailer includes a kitchen unit, having suitable means for the storage of food, dishes and utensils, for the preparation of food, and for dishwashing, adapted to be used indoors at a convenient height relative to the trailer floor, and outdoors at substantially the same height relative to the ground. The kitchen unit is always confined within the camper body when the trailer is in motion, but may, if desired, be projected downward and outward along a supporting and guiding ramp, weather permitting, for use when camping. Preferably, and as shown, the kitchen unit is located near one end of the trailer and is projected and retracted through a lateral wall of the trailer. Some sitting and sleeping utilities are desirably provided in an inoperative, space-saving condition between the kitchen unit and the adjacent end wall of the trailer, being made accessible and usable by the projecting outward of the kitchen unit.

---

This invention relates to mobile trailers of the kind adapted to provide complete sleeping, cooking and dining accommodations for a traveling party, but is more particularly concerned with those features of such mobile trailers which have to do with the storage and preparation of food, and with cleaning up after a meal. It is not uncommon for a mobile trailer to provide a complete kitchen unit permanently contained within the trailer. The unit may include a refrigerator for perishables, a working counter, closet space for nonperishables, dish closets, utensil closets or drawers, a stove, a sink, and a water supply with suitable drainage.

This kind of arrangement is convenient and adequate in a sense, but every meal must be prepared indoors, regardless of weather conditions, with the consequence that, at every meal, the interior of the trailer becomes saturated with cooking odors, and becomes heated, perhaps uncomfortably, above the outdoor temperature, by the fuel burning which is unavoidably associated with cooking. The conditions within such a trailer are similar to those of any kitchen, with the exception that the trailer is generally smaller than a kitchen, and that it is not only a kitchen but a sitting room and a bedroom. Grease in the air, which is often a concomitant of cooking, is deposited more intensely upon the walls of the smaller trailer than in a kitchen, also upon the dining table, and, more seriously, upon upholstery, drapery, and bedding. It is extremely desirable, therefore, to cook outdoors whenever possible, and especially so in hot or humid weather. Whether the cooking is done indoors or outdoors, it is advantageous to have supplies, utensils, and working space conveniently at hand. A casually available outdoor grill, or a portable stove, is not, therefore, an adequate substitute for indoor kitchen facilities.

It is a feature of the present invention that a complete, or reasonably complete, kitchen unit is provided within the trailer at a convenient height relative to the trailer floor, for the preparing of meals, and for dishwashing purposes, so that it can be used indoors in inclement or cool weather, together with means for projecting the unit in its entirety downward and outward through a vertical wall of the trailer to a lower, predetermined outdoor location in which it is situated at the same convenient height relative to level ground. With this kind of arrangement the utensil and food closets, the refrigerator, the stove, the cooking counter or drain board, the sink and a butane light are all located in the same convenient proximity to one another, indoors and outdoors, and the transfer of the unit from indoors to outdoors, or vice versa, with all facilities fully operative, can be completed in a very short time, generally less than a minute.

It is a further feature that the space between the retracted kitchen unit and the adjacent vertical wall of the trailer is used for the housing, in compact form, of a lower combined seat and bunk and, if desired, an upper bunk, these items being made accessible within the trailer and put into practically usable form when the kitchen unit is projected to the exterior of the trailer.

The very trailer partially shown and described herein for illustrative purposes is further shown and described in my companion application, Ser. No. 813,174, filed concurrently herewith.

Other objects and advantages will hereinafter appear.

In the drawings forming part of this specification:

FIG. 1 is a fragmentary view in side elevation of the forward end of a mobile trailer which embodies the present invention in practical and advantageous form, the trailer being shown as it would appear when traveling, with the kitchen unit confined in the trailer body;

FIG. 2 is a transverse view in sectional elevation, the section being taken on the line 2—2 of FIG. 1, looking in the direction of the arrows;

FIG. 3 is a fragmentary sectional view similar to FIG. 2, but showing the kitchen unit in an intermediate position, as it would appear in the course of being projected or retracted;

FIG. 4 is a fragmentary view, similar to FIGS. 2 and 3, showing the kitchen unit fully projected to the position in which it is used outdoors;

FIG. 11 is a detail view of a bracket (two employed) for removably mounting a supporting rod for a kitchen unit cover; and FIG. 12 is a detail view on a greatly reduced scale showing the kitchen unit cover and the associated supporting rod therefor.

Figure 5:
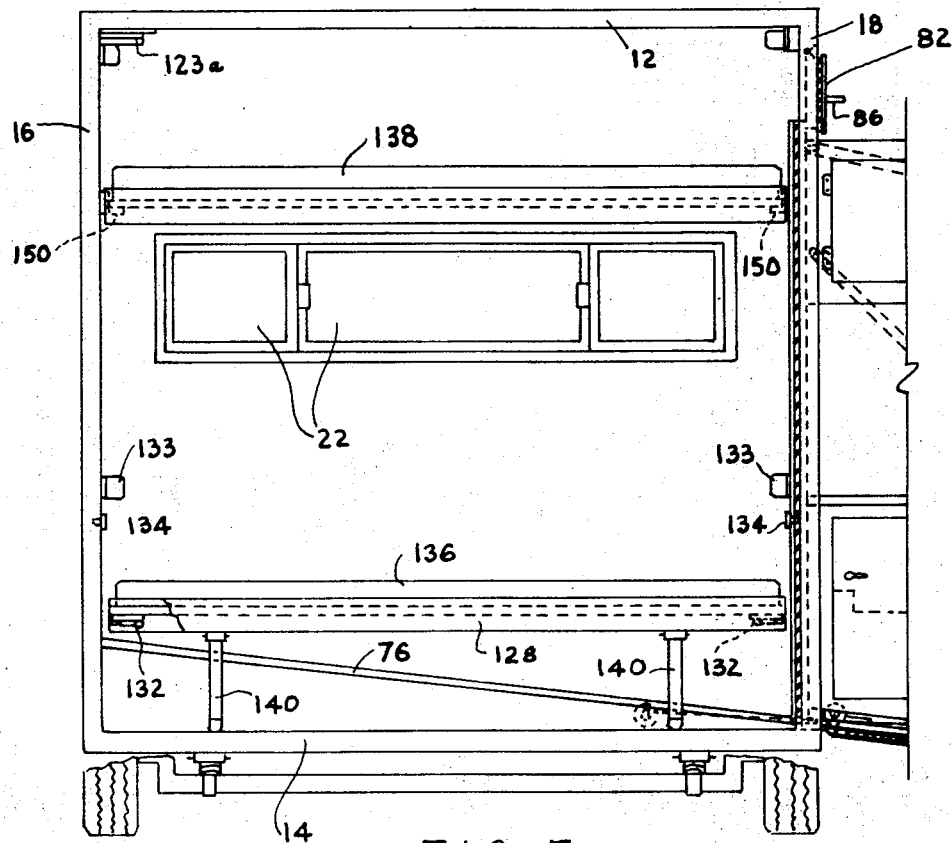
FIG. 5 is a fragmentary view similar to FIGS. 2 to 4, but showing the interior forward end of the trailer when the kitchen unit is fully projected and the forward berths are let down into positions for occupancy.

The particular trailer illustratively disclosed herein is designed to provide dining, sleeping and kitchen facilities for a party of six, with sitting facilities for nine or ten altogether, although the trailer body measures only six and one-half feet wide by less than twelve feet long. The trailer body is of fixed dimensions and may be of conventional construction except as regards features mentioned herein.

The trailer body 10 comprises a roof 12, a floor 14, left and right side walls 16 and 18, a front wall 20 and a rear wall, not shown. The front, rear and side walls are generously provided with windows 22, while the right side wall is provided with a swinging entrance and exit door 24 which may be locked and unlocked from the inside and from the outside. The door is situated a little to the rear of the kitchen unit.

The trailer, of course, includes at least one pair of wheels 26, a spring suspension 28, and a hitch 30, these details being of conventional construction, and shown only in fragmentary form. Jacks may be provided, though not necessarily as unitary parts of the trailer, for stably supporting the trailer when it is detached from the automobile, with the floor in a level condition or substantially so.

The characterizing feature of the present invention is a kitchen unit 32 which is enclosed in the body when traveling, and which may be enclosed when parked in inclement or cool weather, but which may be rolled out and down to a definite, outdoor position for use in fair weather and especially in hot or humid weather. The kitchen unit may also be projected outside to get it out of the way overnight in any kind of weather, if the party numbers more than four, so that more than four sleepers must be accommodated. A cover 32a of canvas or the like and a supporting rod 32b are desirably provided for the kitchen unit, especially for use when the unit is necessarily left projected overnight because of the number of persons requiring sleeping accommodations in the trailer.

The rod is passed through a loop of the cover and is removably supported in notches of brackets 32c which are affixed to the kitchen unit in the locations indicated in FIG. 2. The cover includes a protruding flap 32d which extends inward beyond the inner boundary of the kitchen unit when the parts are in the condition shown in FIG. 4. Flaps 32e and 32f are secured by fasteners (not shown) to the upper and rear margins of the outer cupboard wall 32g of the kitchen unit, while a further flap 32h is similarly secured to the upper margin of the front wall of the kitchen unit. The bottom margin of the cover is secured near the bottom rear edge of the unit.

The kitchen unit 32 comprises an inner wall 34 normally at the left side of the trailer, an outer wall 36 normally at the right side of the trailer, a transverse forward wall 38, and a top or cover wall 39. The kitchen unit may be made to include any kitchen utilities which are necessary to make the unit adequate and reasonably complete for its intended purpose. In the illustrative case the kitchen unit 32 includes a refrigerator or ice box 40 for perishable foodstuffs, and an ice box drain 42. A sink 44 is provided between counter or drain board areas 45, together with a sink drain 47. Utensil storing drawers 48 are included below the counter as well as a cupboard 50. A suitable stove 52 is provided at countertop level. A fuel supply container 54, say a butane container, may be provided in a compartment 56, the compartment 56 being made accessible through a normally locked, louvred outside door 58. The unit also includes a series of cupboard 60 for storing dishes and groceries of a nature not requiring refrigeration.

The sink is provided with two faucets 62 and 64, the former being connectible through a supply line 66 for furnishing local water under pressure when available, and the latter connected through a hand pump 68 and a conduit 70 with a water supply container 72 placed under the counter.

In order that the projected kitchen unit may be adequately lighted when used outside after dark, it is equipped with a butane burning light 73 of convention construction, the light being furnished with gas from the butane bottle 54 through a conduit 75. The light 73 desirably includes a heat shield 77. The light can also be used indoors, but it is of little importance there because electric lights are also provided indoors.

A less adequate kitchen unit would still be useful and would satisfy the minimum requirements of the present invention. The water supply and drain lines include at the outside of the right hand kitchen unit wall suitable means of a conventional nature for making the required water supply and drain connections. Water supply and drain hoses, customarily provided as a part of trailer parking facilities, are long enough to serve the kitchen unit in either the retracted or the projected condition.

The kitchen unit, when housed within the trailer, maintains the counter 46, the sink 44, and the stove 52 at a convenient, conventional working level relative to the floor of the trailer. If the kitchen unit were maintained at the same level when projected outside, it would occupy an inconveniently high position relative to level ground. It is accordingly a feature that the unit 32 is normally supported by a sloping ramp 76, and that provision is made of a ramp extension 74, the latter providing the chief support for the projected kitchen unit with the countertop and stove at substantially the same convenient working level relative to the level ground on which the trailer is parked.

Figures 6, 7:
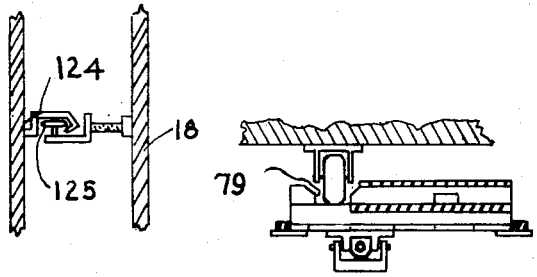
FIG. 6 is a fragmentary, detail sectional view of a guide means employed for helping in maintaining the upright attitude of the kitchen unit in projected and retracted positions, and in all intermediate positions.
FIG. 7 is a fragmentary detail sectional view showing particularly a portion of the ramp guide and one of the unit rollers that run in the guide.

The fixed ramp section 76 slopes downward from left to right as viewed in FIGS. 2, 3 and 4. The fixed ramp section is formed with a narrow channel 79 as seen in FIG. 7, for confining and guiding supporting rollers 78 and 80 of the kitchen unit, as seen in FIGS. 2 and 4. The rollers 78 and 80, carried by the kitchen unit, are, of course, arranged on the same slope as the fixed ramp section, so that the kitchen unit may be maintained in upright position.

In the condition of FIG. 1, the lower margin and the forward vertical margin of the right hand wall 36 of the kitchen unit are covered by the L-shaped ramp extension 74. The upper end of the ramp extension 74 and the upper margin of the kitchen unit wall 36 are covered by a closure flap which is hingedly connected along its upper edge to the trailer wall 18.

Figures 9, 10:
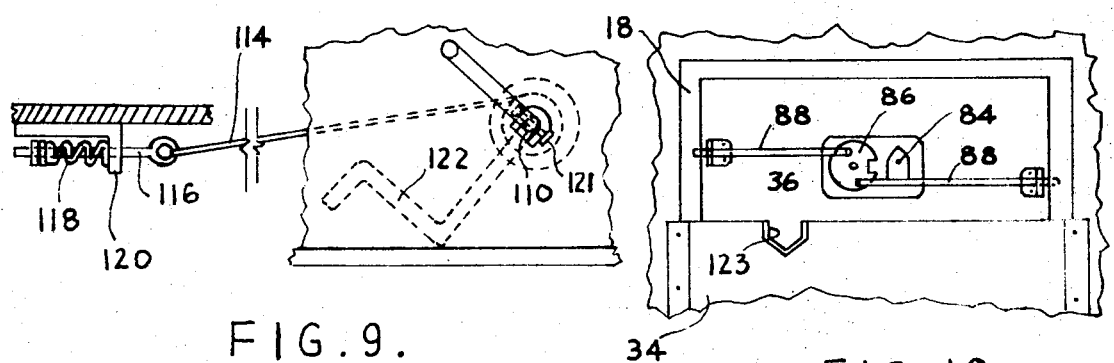
FIG. 9 is a fragmentary view showing a winch-operating lever in operating position in full lines, and in tension maintaining position in dotted lines.
FIG. 10 is a fragmentary detail view showing latching means of the upper cover flap as seen from the inside of the trailer with the kitchen projected and the cover flap closed.

The first step necessary to the projection of the kitchen unit to its outdoor position is the unlocking of the flap 82 by a key inserted into a key slot 84. This frees an unlatching handle 86 to be turned a quarter turn counterclockwise, as viewed in FIG. 1 (clockwise as viewed in FIG. 10), to withdraw retaining bolts 88 from retaining positions behind adjacent marginal areas of the trailer side wall 18. While this is being done the combined ramp section and retaining wall member 74 should be held up with the free hand, since otherwise it might drop a considerable distance and cause damage. The flap 82 is swung upward to a horizontal position in which it stands completely clear of the ramp extension 74, as shown in FIG. 2, a position in which it may be retained by a toggle 90. When the toggle 90 has been straightened, or moved a little across dead center, to retain the flap 82 in raised position, the ramp extension 74 is lowered as far as a toggle 92, connected to the trailer wall 18 and to the ramp extension 74, will permit. This aligns the ramp extension 74 with the fixed ramp section 76, with the free end of the ramp extension standing just a short distance from the ground, but it does not provide adequate support for enabling the ramp extension to bear a major portion of the weight of the kitchen unit 32.

Figure 8:
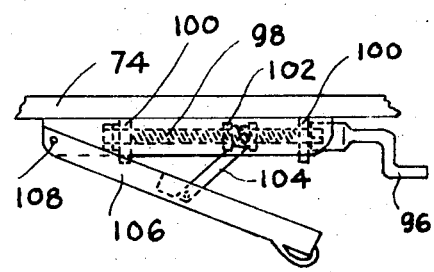
FIG. 8 is a fragmentary, detail view showing a supporting foot of the ramp extension and adjusting means therefor.

The ramp extension 74 has adjustably mounted on its outer end a ground supporting foot 94 which is adjusted to engage the ground and provide positive support for the outer end of the ramp extension in the exact position indicated by the straightened toggle 92. For effecting this adjustment, a crank 96 (FIG. 8) may be temporarily applied to the polygonal end of a screw 98 and turned to rotate the screw in bearings 100, which bearings are affixed to the ramp extension 74. The screw is threaded through a sleeve or nut 102, the sleeve being connected through a link 104 to a pivoted arm 106. The arm 106 is pivoted at 108 on the ramp extension 74, and the arm carries at its outer end the ground engaging foot 94. It will be seen that the screw provides a one-way or irreversible drive from the screw, when the screw is turned in either direction by the crank 96, to the arm 106, the screw being capable of driving the arm, but the arm being incapable of turning the screw. It will also be apparent that because of the low pitch of the screw, the screw positively retains the foot in any selected position to which it may have been adjusted relative to the ramp extension 74. The adjustment is an infinitely variable one.

When the adjustment of the ramp extension 74 has been satisfactorily effected, the kitchen unit may be rolled out from the normal position of FIGS. 1 and 2, through the position of FIG. 3 to the position of FIGS. 4 and 5. In that position the inner wall of the kitchen unit closes and seals the opening in the wall 18, with the exception of the arm covered by flap 82. The flap 82 may be lowered and latched closed, completely to seal the trailer body against ingress of rain and insects.

A winch 108, fast on a horizontal shaft 110 which extends forward into a compartment 112, is connected through a cable 114, a link 116, a compression coil spring 118, and a bracket 120 to exert tension upon the kitchen unit, tending to pull the kitchen unit inward to its innermost limit of movement and maintain it there under tension. The shaft 110, whose forward end, as noted, is located in the compartment 112, has permanently secured upon it, by means of a cross-pin 121, a crank 122. The pin 121 extends at right angles to the axis of the shaft and the crank can be turned about the axis of the cross-pin between the full line position of FIG. 9, in which it can be operated to turn the shaft, and the dotted line position of FIG. 9 in which it limits retrograde turning of the shaft. Normally, however, when operating the winch to pull in the kitchen unit, the unit is pulled in until it can go no further, and the crank is operated still further to compress the spring 118. The crank is then turned about the axis of pin 121 to lodge it within the compartment 112. Engagement of the crank with the floor of the compartment 112 maintains the spring 118 compressed and so prevents rattles and squeaks when the trailer is in motion. At this point a notch 123 formed in the upper margin of the inner wall 34 of the kitchen unit fits snugly around the lower portion of a fixed, wedge-shaped guide 123a. It is in this condition that the winch and lever are found when it is desired to project the kitchen unit to its outdoor position.

When, in the course of projecting the kitchen unit to its outdoor position, the ramp extension has been lowered and adjusted, the cover 124 of compartment 112 is unlocked and opened, the crank is swung into alignment with the shaft, and the paying out of the cable is controlled manually through the crank. The slope of the ramp is such that the kitchen unit will travel down the ramp and the ramp extension under the influence of gravity, and this must be limited and held in check by the crank in order to effect orderly transition.

When the projection of the kitchen unit has been completed as shown in FIG. 4, the kitchen unit is made completely available for outdoor use, with the water supply facilities (if any) and the drain facilities (if any) just as available and operative as they would have been with the kitchen facilities in their fully retracted or indoor position. The refrigerator, the refrigerated foodstuffs, the unrefrigerated groceries, the dishes and the utensils are just as intimately associated with the stove, the sink, and the counter as if the kitchen unit were still indoors, and the counter space is available for use in conjunction with the stove and sink, and for other usual purposes. All the convenience of an indoor kitchen is provided outdoors.

The closure flap 82 may now be lowered and locked in lowered position. Through the provision of appropriate sealing strips of sponge rubber, this is effective to close and seal all the seams between the closure flap on the one hand, and the trailer wall and inner wall of the kitchen unit, to protect against ingress of insects and rain from outside the trailer body.

It is a very important point that the stability of the kitchen unit, and the freedom of that unit from rattling and squeaking, are promoted by the provision of a sloping guideway 124a on the kitchen unit, parallel to the ramp, and a roller 125 on the wall 18 of the trailer, confined in the guideway.

When it is desired to retract the kitchen unit to its normal position within the trailer body, the flap 82 is raised, and the crank 122 is operated in the direction to reel in the cable 114 onto the winch 108, until the kitchen unit is fully restored to its indoor position. The crank is further operated to compress the spring 118 and is then swung in to the dotted line position of FIG. 9 as already explained. The compartment 112 is then locked closed, the foot 94 is retracted, and the ramp extension 74 is returned to normal, kitchen-unit-confining position, and locked in that position. Finally, the flap 82 is closed and locked down.

It should be noted, however, that when the kitchen unit is in projected or outdoor position, the front end of the interior of the trailer is made accessible, and that this exposes for use a davena and an upper berth in the forward end of the trailer body.

This increases both the sitting and the sleeping capacity of the trailer so long as the kitchen unit is maintained in its projected or outdoor position, as will be evident from a joint consideration of FIGS. 1 and 5.

On the rear boundary of a short horizontal shelf 126 which extends rearward from the front wall of the trailer, a davena panel 128 is mounted through a piano hinge 130. The panel 128 is normally held up in vertical position by latches 132, against stops 143, the latches being carried by the panel 128 at opposite ends thereof, and the latches being cooperative with fixed, apertured plates 134. A cushion of generally fixed shape 136, and a cushion 138, hinged in the middle, are normally stored on the shelf 126 and between the upturned panel 128 and the front wall 20 of the trailer. When the kitchen unit has been projected outdoors, the panel 128 may be unlatched, hinged legs 140 affixed to its lower face may be swung from positions flat against the lower face of the panel to positions perpendicular to it, and the panel may be swung rearward to rest horizontally upon the extended legs 140. The cushion 136 is placed on the panel 128 and the cushion 138, doubled thickness, is placed upright upon the forward margin of the cushion 136 and in contact with the forward end of the trailer body, to serve as a back rest. The davena thus provides seating accommodations, if required, for four individuals until bed time.

At or before bed time, an upper berth panel 142 secured to a supporting shelf 144 through a piano hinge 146, and normally retained in an up-folded vertical position by latches 148 (see FIG. 1), is let down onto horizontally extending angle bar ledges 150, the cushion 138 is shifted (single thickness) to the upper panel 142. Upper and lower berths are thus provided at the forward end of the trailer. The upper panel is desirably provided with a marginal guard for confining the cushion 136.

So long as the party stays in one camping spot, the kitchen unit may remain projected to the outdoor position and the davena and upper berth may be utilized as required. When the time comes for moving on, the davena, the upper berth and the associated cushions may be restored to the condition of FIG. 1, and the kitchen unit and associated parts may be returned to the condition of FIG. 1.

I have shown and described what I believe to be the best embodiment of my invention. I do not wish, however, to be confined to the embodiment shown.

I claim:
1. A mobile trailer including, in combination:
   (a) a kitchen unit having suitable means for the storage and preparation of food and for dish washing, including a working counter adapted to be used indoors at a convenient height relative to the trailer floor and outdoors at substantially the same height relative to level ground, said unit being adapted to be contained within the trailer whenever the trailer is in motion,
   (b) a vertical wall having an opening through which the kitchen unit may be projected and retracted, which opening is partially closed by the unit, itself, in both the retracted and projected positions of the unit, and
   (c) cooperating supporting and guiding means on the kitchen unit and the trailer body for guiding the kitchen unit in an upright attitude between a predetermined, higher indoor position and a predetermined lower outdoor position, including
      (c1) fixed ramp and guide forming means within the trailer body, and
      (c2) a hinged adjustable member normally forming a vertical partial closure for confining the kitchen unit indoors, but mounted for operation to an extended, inclined position in line with the path defined by the fixed ramp and guide forming means within the trailer body, and constructed and arranged to form a directly continued unit supporting and guiding ramp extension.

2. A mobile trailer as set forth in claim 1 in which the kitchen unit is located near one end of the trailer and, when retracted, extends through substantially the entire width of the trailer, and in which the wall through which the kitchen unit is projected and retracted is a lateral wall, and is provided with an entrance and exit door somewhat farther from such trailer end than the kitchen unit.

3. A mobile trailer as set forth in claim 2 in which the kitchen unit is located near the forward end of the trailer.

4. A mobile trailer as set forth in claim 1 in which a winch and cable combination is provided for restraining the running of the kitchen unit down the ramp sections, and for pulling the kitchen unit up the ramp sections, together with means for manually operating the winch.

5. A mobile trailer as set forth in claim 4 in which the winch and cable operating means includes a shaft, and a crank pivotally mounted on the shaft for movement about an axis at right angles to the shaft axis, a housing is provided for the winch and cable operating means, and a spring connection is provided between the cable and the kitchen unit which may be put under strain by the winch operating crank after the kitchen unit has reached its innermost limit of movement, the construction and arrangement being such that the handle may be swung into the winch housing with the spring under strain, and will serve by engagement with the housing to maintain the spring under strain, thereby to prevent free play and rattling of the kitchen unit during travel of the trailer.

6. A mobile trailer as set forth in claim 1 in which a davena shelf is provided between the kitchen unit and the adjacent vertical wall of the trailer, together with means supporting and retaining the shelf normally in a vertical, space-saving position, but with capacity for swinging into a horizontal position when the kitchen unit is projected outward, to provide a seat before retirement and a berth for retirement.

7. A mobile trailer as set forth in claim 6 which further includes an upper shelf between the kitchen unit and the adjacent vertical trailer wall, and means supporting the shelf from said wall with capacity for swinging between vertical and horizontal positions, means normally retaining the shelf in a vertical, space-saving position, and means for supporting the shelf in horizontal position when the kitchen unit has been projected outward and the shelf has been swung to horizontal position to provide an upper berth for sleeping purposes.

8. A mobile trailer as set forth in claim 7 in which the space between the kitchen unit in its traveling or retracted position and the adjacent wall of the trailer is ample to house cushions for the lower davena and the upper berth, which cushions may be normally hidden by the kitchen unit.

9. A moblie trailer as set forth in claim 1 in which the adjustable ramp and guide section normally occupies a vertical position in which it overlaps the lower outer margin and a vertical outer margin of the kitchen unit, the trailer further including an upper flap member pivotally mounted above the trailer wall opening to confine the ramp and guide member and the kitchen unit when the unit is retracted, while sealing the portion of the wall opening above the unit, and also to seal the portion of the wall opening above the unit when the unit is projceted, and means for retaining the flap in a raised, non-obstructing position during operation of the kitchen unit between projected and retracted positions.

10. A mobile trailer as set forth in claim 1 in which the kitchen unit guiding means also comprises a sloping guideway affixed to an upper portion of the unit in parallelism with the fixed ramp section, and a guide member cooperative with said sloping guideway is affixed to the trailer wall through which the kitchen unit passes.

11. A mobile trailer as set forth in claim 1 in which a toggle connects the free end of the movable ramp section to an upper part of the open-sided trailer wall for locating the lowered movable ramp section in correct unit-guiding and unit-supporting position when the toggle is fully straightened, a ground engaging foot carried by the free end of the movable ramp section and providing positive ground support for such free end, and a one-way, positive driving means for adjusting the foot up and down relative to the ramp section on which it is carried and effective to lock the foot in any position to which it is adjusted.

References Cited

UNITED STATES PATENTS 3,406,999 10/1968 Kozicki _____ 296—23
2,329,419 9/1943 Reed _____ 296—23

PHILIP GOODMAN, Primary Examiner